US007930739B1

(12) United States Patent
Nachenberg

(10) Patent No.: US 7,930,739 B1
(45) Date of Patent: Apr. 19, 2011

(54) SCALED SCANNING PARAMETERIZATION

(75) Inventor: Carey Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 1197 days.

(21) Appl. No.: 11/136,098

(22) Filed: May 24, 2005

(51) Int. Cl.
*G06F 11/00* (2006.01)
*G06F 12/14* (2006.01)
*G06F 12/16* (2006.01)
*G08B 23/00* (2006.01)

(52) U.S. Cl. .......................................... 726/22; 726/11
(58) Field of Classification Search .................. 726/22, 726/23, 25, 11
See application file for complete search history.

(56) References Cited

U.S. PATENT DOCUMENTS

| 6,529,508 | B1 * | 3/2003 | Li et al. ........................ 370/392 |
| 6,715,084 | B2 * | 3/2004 | Aaron et al. ..................... 726/23 |
| 6,775,657 | B1 * | 8/2004 | Baker ............................ 706/45 |
| 6,987,468 | B1 * | 1/2006 | Malvar ............................ 341/59 |
| 6,990,591 | B1 * | 1/2006 | Pearson ........................... 726/22 |
| 7,015,837 | B1 * | 3/2006 | Malvar ............................ 341/59 |
| 7,151,790 | B1 * | 12/2006 | Patenaude et al. ........... 375/132 |
| 7,305,708 | B2 * | 12/2007 | Norton et al. ................... 726/23 |
| 7,333,923 | B1 * | 2/2008 | Yamanishi et al. ............... 703/2 |
| 7,580,585 | B2 * | 8/2009 | Malvar .......................... 382/245 |
| 2003/0014377 | A1 * | 1/2003 | Barson et al. .................... 706/20 |
| 2003/0182580 | A1 * | 9/2003 | Lee ................................ 713/201 |
| 2003/0188191 | A1 * | 10/2003 | Aaron et al. ................... 713/201 |
| 2004/0221178 | A1 * | 11/2004 | Aaron et al. ................... 713/201 |
| 2005/0235360 | A1 * | 10/2005 | Pearson ........................... 726/23 |
| 2005/0273857 | A1 * | 12/2005 | Freund ............................. 726/23 |
| 2006/0051039 | A1 * | 3/2006 | Wei .............................. 385/123 |
| 2006/0053123 | A1 * | 3/2006 | Ide et al. ........................ 707/100 |
| 2006/0092053 | A1 * | 5/2006 | Malvar ............................. 341/51 |
| 2006/0103556 | A1 * | 5/2006 | Malvar ............................. 341/63 |
| 2006/0191010 | A1 * | 8/2006 | Benjamin ........................ 726/23 |
| 2007/0192867 | A1 * | 8/2007 | Miliefsky ........................ 726/25 |

OTHER PUBLICATIONS

Prakash et al., A middle ground between CAMs and DAGs for high-speed packet classification, Aug. 2002, IEEE, HOTIC.*
Baboescu et al., Scalable Packet Classification, Feb. 2005, IEEE.*
Gupta et al., Packet Classification on Multiple Fields, 1999, <http://citeseerx.ist.psu.edu/viewdoc/summary?doi=10.1.1.137.3147>.*

* cited by examiner

*Primary Examiner* — David García Cervetti
(74) *Attorney, Agent, or Firm* — Hunton & Williams LLP

(57) ABSTRACT

Evaluating a data transmission is disclosed. In various embodiments evaluating the data transmission may include transforming a parameter associated with the data transmission into an augmented parameter wherein the augmented parameter represents a plurality of binned parameters. The augmented parameter is matched to a scaled parameterized rule set wherein the scaled parameterized rule set references the augmented parameter. The scaled parameterized rule set is applied to the data transmission.

15 Claims, 6 Drawing Sheets

| Rule | SRC Port | DEST Port | Protocol | Signature | Scan Distance |
|---|---|---|---|---|---|
| 1 | ANY | 1020 | TCP | abcdefg | 20 bytes |
| 2 | ANY | 1210 | TCP | hijklmn | 30 bytes |
| 3 | 300 | 50 | TCP | foobar | 40 bytes |
| 4 | ANY | 80 | TCP | bletch | 100 bytes |
| 5 | 25 | ANY | TCP | argh | 70 bytes |
| 6 | 2050 | ANY | TCP | icky | 60 bytes |
| 7 | 2051 | 1025 | TCP | oof | 50 bytes |
| 8 | ANY | 50 | TCP | aa | |
| 9 | ANY | 1025 | TCP | bb | |
| 10 | 300 | ANY | TCP | cc | |
| 11 | 2051 | ANY | TCP | dd | |

| Rule Set | SRC Port | DEST Port | Protocol | Signature (s) | Scan Distance |
|---|---|---|---|---|---|
| 1 | 25 | 1020 | TCP | abcdefg, argh | 70 bytes |
| 2 | 25 | 1210 | TCP | hijklmn, argh | 70 bytes |
| 3 | 25 | 50 | TCP | argh, aa | 70 bytes |
| 4 | 25 | 80 | TCP | bletch, argh | 100 bytes |
| 5 | 25 | 1025 | TCP | argh, bb | 70 bytes |
| 6 | 300 | 1020 | TCP | abcdefg, cc | 20 bytes |
| 7 | 300 | 1210 | TCP | hijklmn, cc | 30 bytes |
| 8 | 300 | 50 | TCP | foobar, aa, cc | 40 bytes |
| 9 | 300 | 80 | TCP | bletch, cc | 100 bytes |
| 10 | 300 | 1025 | TCP | cc, bb | |
| 11 | 2050 | 1020 | TCP | abcdefg, icky | 60 bytes |
| 12 | 2050 | 1210 | TCP | hijklmn, icky | 60 bytes |
| 13 | 2050 | 50 | TCP | icky, aaa | 60 bytes |
| 14 | 2050 | 80 | TCP | bletch, icky | 100 bytes |
| 15 | 2050 | 1025 | TCP | icky, bb | 60 bytes |
| 16 | 2051 | 1020 | TCP | abcdefg, dd | 20 bytes |
| 17 | 2051 | 1210 | TCP | hijklmn, dd | 30 bytes |
| 18 | 2051 | 50 | TCP | aa, dd | |
| 19 | 2051 | 80 | TCP | bletch, dd | 100 bytes |
| 20 | 2051 | 1025 | TCP | oof, bb, dd | 50 bytes |

| Rule | SRC Port | DEST Port | Protocol | Signature | Scan Distance |
|---|---|---|---|---|---|
| 1 | ANY | 100000 | TCP | abcdefg | 20 bytes |
| 2 | ANY | 100001 | TCP | hijklmn | 30 bytes |
| 3 | 100000 | 100000 | TCP | foobar | 40 bytes |
| 4 | ANY | 80 | TCP | bletch | 100 bytes |
| 5 | 25 | ANY | TCP | argh | 70 bytes |
| 6 | 100002 | ANY | TCP | icky | 60 bytes |
| 7 | 100002 | 100001 | TCP | oof | 50 bytes |
| 8 | ANY | 100000 | TCP | aa | |
| 9 | ANY | 100001 | TCP | bb | |
| 10 | 100000 | ANY | TCP | cc | |
| 11 | 100002 | ANY | TCP | dd | |

304 ↑

Example:
Scaling factor = 1024
Baseline Number = 100000

FIG. 3C

| Rule Set | SRC Port | DEST Port | Protocol | Signature (s) | Scan Distance |
|---|---|---|---|---|---|
| 1 | 25 | 100000 | TCP | abcdefg, argh, aa | 70 bytes |
| 2 | 25 | 100001 | TCP | hijklmn, argh, bb | 70 bytes |
| 3 | 25 | 80 | TCP | bletch, argh | 100 bytes |
| 4 | 100000 | 100000 | TCP | abcdefg, foobar, aa, cc | 40 bytes |
| 5 | 100000 | 100001 | TCP | hijklmn, bb, cc | 30 bytes |
| 6 | 100000 | 80 | TCP | bletch, cc | 100 bytes |
| 7 | 100002 | 100000 | TCP | abcdefg, icky, aa, dd | 60 bytes |
| 8 | 100002 | 100001 | TCP | hijklmn, icky, oof, bb, dd | 60 bytes |
| 9 | 100002 | 80 | TCP | bletch, icky, dd | 100 bytes |

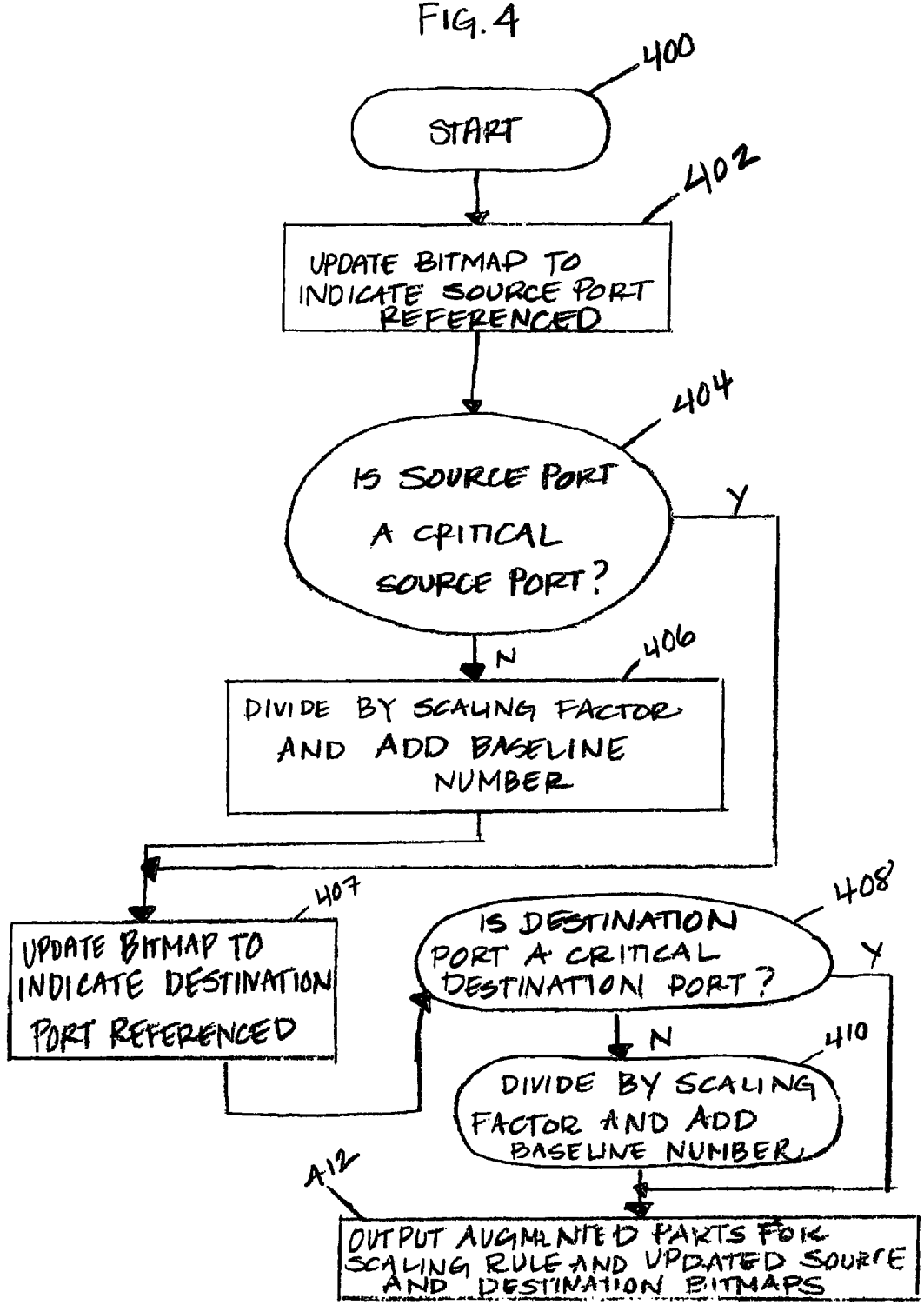

SCALED SCANNING PARAMETERIZATION

BACKGROUND OF THE INVENTION

Security applications such as intrusion detection systems (IDS) or intrusion prevention systems (IPS) utilize scanning parameterization. Scanning parameterization involves using certain information such as port and protocol information for a network flow to identify the specific scanning parameters and subset of signatures that should be applied to the flow. If an application simply scans every flow for every possible signature, it will have slow performance. If the application is able to apply only a small subset of signatures to a given flow using the most appropriate scanning algorithm, performance can be improved. Scanning parameters specified for a typical TCP/IP based IDS/IPS system may include the amount of the flow to scan; the offsets within the flow's stream and/or packets that should be scrutinized for signatures; the subset of general purpose signatures that should be searched for; and the scanning algorithm that should be used on each flow.

Scanning parameterization is typically done using the protocol tuple: {source port, destination port, protocol}. Given a set of rules that specify scanning parameters and refer to "S" number of unique source ports and "D" number of unique destination ports, parameterization may result in up to S×D number of parameterized rule sets for a complete set of protocols. As the number of source ports and destination ports increases, a large number of parameterized rule sets may be generated, requiring additional system storage resources. Other transmission data may also be used to parameterize rules and rules may specify more than one protocol, also resulting in many parameterized rule sets. A solution for scanning parameterization resulting in fewer parameterized rule sets would be useful.

BRIEF DESCRIPTION OF THE DRAWINGS

Various embodiments of the invention are disclosed in the following detailed description and the accompanying drawings.

FIG. 3A is a table including rules that have not yet been parameterized.

FIG. 3B is a table illustrating parameterized rule sets for network transmission evaluation.

FIG. 3C is a table illustrating the rules from FIG. 3A where the source and destination ports are binned.

FIG. 3D is a table illustrating the parameterized rule sets that result from using the binned parameter versions of the original rules shown in FIG. 3C.

FIG. 4 is a flow chart illustrating a compilation process for an original rule that specifies the application of a signature to a tuple.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As described in various embodiments below, binning the parameters used to parameterize a set of rules avoids the proliferation of a large number of rule sets after scanning parameterization and requires less system storage resources. Additionally, providing exceptions to the binning for critical parameters and avoiding binning unreferenced parameters at run time reduces unnecessary application of irrelevant parameterized rule sets.

Figure 1:
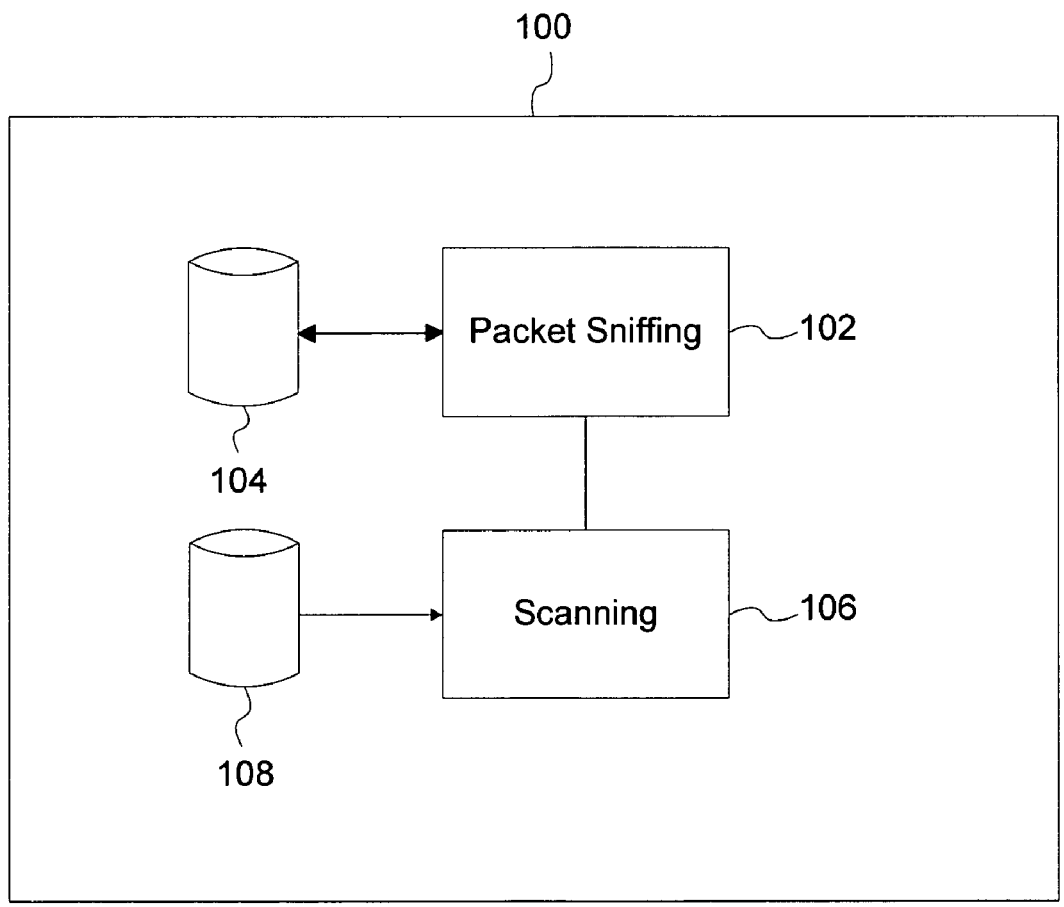
FIG. 1 is block diagram illustrating an example of a network transmission evaluation system with parameterization.

FIG. 1 is block diagram illustrating an example of a network transmission evaluation system with parameterization. The system may be implemented in an IDS, IPS, or other any other system that analyzes data flows. The techniques described herein may be applied to any type of data transmission. For the purpose of illustration, a network data flow of packets characterized by a protocol tuple is used as an example.

System 100 includes packet sniffing module 102 that monitors packets from data flows. System 100 may be remotely located or installed locally in a manner that enables it to sample data flows. In the example shown, packet sniffing module 102 stores data such as copies of packets from data flows in database 104. In other embodiments, secondary storage or copying is not required. The packets are directed to scanning module 106. Scanning module 106 scans data flows, initiating a security action such as generating an alert or calling another application if a threat is detected. Policy store 108 is a database that stores rules and other information used for scanning.

Figure 2:
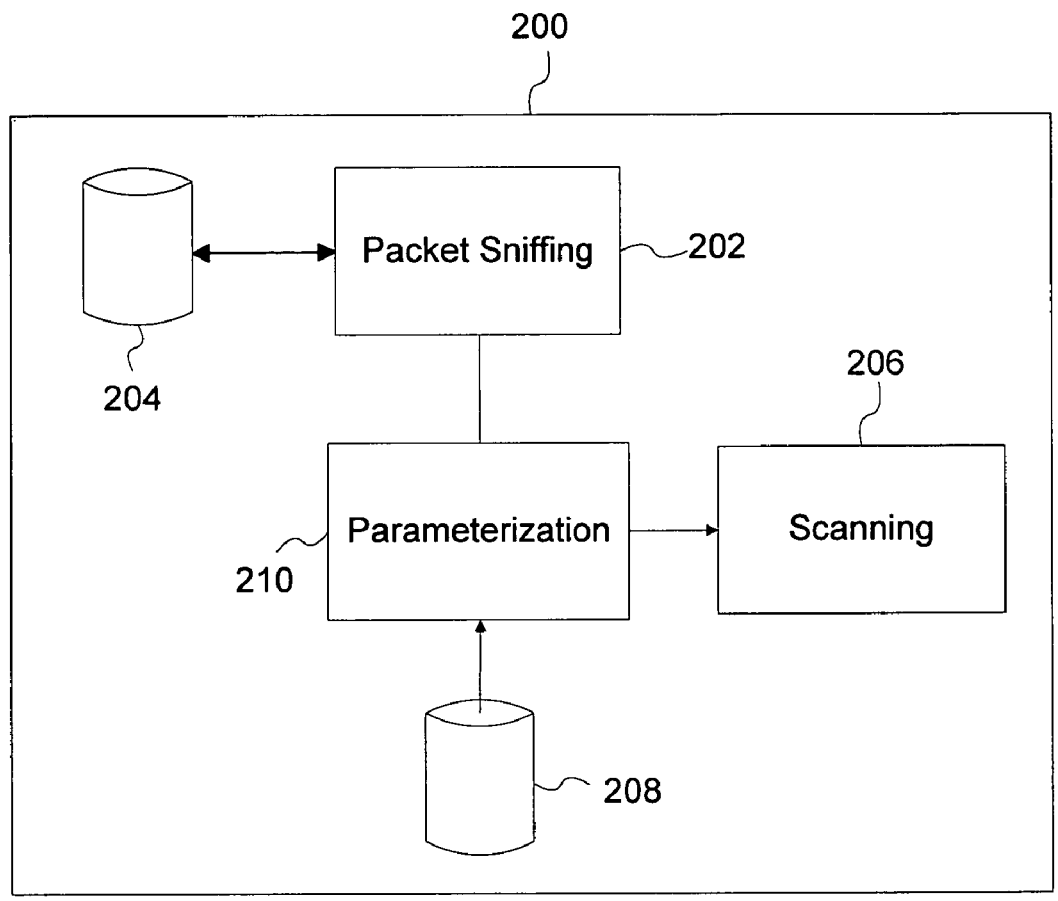
FIG. 2 is block diagram illustrating an example of a network transmission evaluation system with parameterization.

FIG. 2 is block diagram illustrating an example of a network transmission evaluation system with parameterization. Like system 100, system 200 includes a packet sniffing module 202, database 204 (optional), scanning module 206, and policy store 208. System 200 additionally includes a parameterization module 210 that generates parameterized rule sets. During compile time, parameterization module 210 scales and parameterizes scanning rules into rule sets stored in policy store 208 for data flows sampled by packet sniffing module 202. During run time, parameterization module 210 processes parameters of flows so that the appropriate scanning rule set may be applied. Parameterization module 210 is shown for the purpose of illustration as one module communicating with the scanning module as during run time. Parameterization module 210 may also be split into run time and compile time modules and may communicate with the other components of system 200 in various ways. FIG. 2 is only one example of a system and the techniques described herein also apply to other architectures and components.

When a packet is received by system 200, packet sniffing module 202 captures data from the packet. Scanning module 206 evaluates parameters in the captured data to determine the set of signatures that need to be run against the packet. For the purpose of illustration, a system where source and destination ports numbers are the parameters that are evaluated for each packet is described in detail. In various other embodiments, other parameters are evaluated. Typically, this parameterization check will be done at the start of a TCP flow and only done once for the flow, since all of the packets in the flow will have the same parameterization. Although this could be used for each packet in a flow, or possibly for each protocol state within a flow as well.

FIG. 3A is a table including rules that have not yet been parameterized. For the purpose of this example, each row of table 300 is referred to as a "rule." Table 300 is therefore a "set of rules." Each column in table 300 represents a different "parameter." In this example, there is only one protocol, TCP. The tuple of parameters, the source port and the destination port, are the parameters used to parameterize the set of rules. The signature and scan distance are "scanning parameters" that specify how scanning is to be performed on flows that match the rules.

Parameterizing a set of rules results in a "parameter table." Each line in the parameter table represents a "rule set" that is the result of combining rules from the original set of rules. Each rule set applies scanning parameters that are derived from one or more of the original rules. For example, a rule set may apply signatures from two or three rules that apply to a given flow and may use a scan distance that matches the longest scan distance among the applicable rules. For a given flow, only one rule set from the parameter table need be applied. Thus, determining which rules to apply is simply a matter of locating the flow in the parameter table.

Rule 1 specifies that a network transmission from any source port to a destination port 1020 is to be scanned for the signature "abcdefg." The scan distance represents how much of the network transmission is to be scanned. In this case, the first 20 bytes are scanned for "abcdefg." The other rules specify other signature scans that are performed against network transmissions that match the source port and destination port criteria specified in those rules.

FIG. 3B is a table illustrating parameterized rule sets for network transmission evaluation. Parameter table 302 includes all of the parameterized rule sets that result from parameterizing the original rules shown in FIG. 3A. A parameterized rule set may be expressed for every possible combination of unique source and destination port numbers. Generally, a new rule parameterized rule set is generated when there are at least two rules, one of the form {fixedsrcport, wildcardeddestport} and a second rule of the form {wildcardedsourceport,fixeddestport}. This will result in a rule: {fixedsrcport,fixeddestport} associated with both (all) sets of scanning parameters. The unique source port numbers include 25, 300, 2050, and 2051. The unique destination port numbers include 50, 80, 1020, 1025, and 1210. Since there are 4 unique source ports and 5 unique destination ports, the number of possible combinations (tuples) is 4×5=20. Thus, there are 20 individual parameterized rule sets illustrated in parameter table 302.

Each parameterized rule set in the parameter table represents a combination of one or more original rules and may specify more than one signature to be applied. The scan distance specified is the greatest scan distance specified in an original rule included in each parameterized rule set. In some cases, the minimum value of all possible original rules is chosen or the intersection of a field across all possible original rules. The parameterized rule sets may be sorted or indexed by source port and destination port, making them easier to search. The parameterized rule set that applies to each tuple can be efficiently found by searching. However, as the number of source port and/or destination port numbers increases, the number of parameterized rule sets also increases. If there are N unique source ports and N unique destination ports referred to in the initial rules, then $N^2$ parameterized rule sets would result, leading to a large parameter table that would require a large amount of memory.

In this example, if a parameter in a network transmission indicates that a rule set should be invoked, then the network transmission is scanned for one or more threat signatures associated with the parameter. For every threat signature, a rule may specify a scan distance, which determines the number of bytes in a network transmission to be scanned. If multiple signature scans are performed, then the longest scan distance is scanned. For example, in the case of rule set 4, signatures "bletch" and "argh" are scanned if a network transmission has a source port of 25 and a destination port of 80. The "argh" signature has a scan distance of 70 bytes, but the longer scan distance of 100 bytes corresponding to the "bletch" signature is used.

FIG. 3C is a table illustrating the rules from FIG. 3A where the source and destination ports are binned. Binning refers to grouping parameters in the rules so that there are fewer unique parameters included in an augmented or transformed version of the original rules. In one embodiment, the source and destination ports from FIG. 3A are each binned by dividing each by a scaling factor (1024) and then have a baseline value added (1000000) to each yield an augmented set of port numbers. The augmented port numbers are guaranteed to be outside of the range of normal TCP ports as long as the baseline value is greater than the maximum valid port value. This technique can be used in order to decrease the number of parameterized rule sets that result when the original rules are parameterized. Fewer unique parameters results in fewer parameterized rule sets.

A potential disadvantage of binning parameters is that certain packets that have distinguishable unbinned parameters may have the same binned parameters. A signature that would only need to be applied to designated packets having a certain set of unique parameters may be applied to other packets that have parameters that are binned with the parameters of the designated packets. A bin scaling factor is provided so that a desirable compromise can be reached between larger bins and fewer parameterized rules and smaller bins and fewer unnecessary signatures applied. The bin scaling factor controls the number of original parameters that are binned together into a single binned parameter.

In addition, certain port numbers that are expected to occur very often in packets as a source or destination port are excluded from the binning process so that unnecessary signatures are not applied to the large number of packets that include those ports. Such designated "critical source ports" may be excluded from binning. Typically, these ports include well-known TCP/UDP/etc ports that are expected to have high levels of network traffic (e.g. port 80 (HTTP), port 25 (SMTP), port 21 (FTP), port 23 (TELNET), etc). Likewise, a set of "critical destination ports" are also excluded.

In FIG. 3C, a scaling factor determines that the bin size is 1024. That is, 1024 unique original parameters are mapped to a single binned parameter. Rules 1, 3, and 8 are binned because each has a destination port that is less than 1024. Rules 6, 7 and 11 are binned because each has a source port that is greater than or equal to 2048 and less than 3072. By dividing each source port and destination port number by the scaling factor and then adding a base value of 100000, each source port and destination port is translated into a resulting binned port number such as 100000, 100001, or 100002. Adding the base value offsets the binned port numbers from any actual port numbers.

Critical source port 25 and critical destination port 80 are excluded from the binning because they are well known ports that are commonly used and subject to large amounts traffic. It is desirable to avoid unnecessary application of inappropriate binned rules to traffic on such ports. Since the critical ports are not binned, rules intended for packets received on other ports in a bin are not unnecessarily applied to packets received on the critical ports that would otherwise be scaled into the same bin.

Packets received on registered (1023-49,151), or dynamic (49,152-65,535) ports that receive fewer network transmissions, on the other hand, are good candidates for binning and translation.

The original network transmission evaluation rules in table 304 include only 3 unique source port numbers and 3 unique destination port numbers after binning. This results in 9 parameterized rule sets instead of 20 parameterized rule sets as was shown in FIG. 3B. Thus, the number of parameterized rule sets is significantly reduced.

FIG. 3D is a table illustrating the parameterized rule sets that result from using the binned parameter versions of the original rules shown in FIG. 3C. Table 306 includes 9 parameterized rule sets. Each parameterized rule set is expressed in terms of binned parameters and represents a combination of the original rules shown in FIG. 3C that were expressed in terms of binned parameters. For example, the destination ports in rule 1 applying abcdefg and rule 3 applying foobar from FIGS. 3A and 3C were binned into a new "meta-port" of 100000. Rule set number 4 in FIG. 4D applies abcdefg and foobar to any packets having source meta-port 100000 and destination meta-port 100000.

FIG. 4 is a flow chart illustrating a compilation process for an original rule that specifies the application of a signature to a tuple. The original protocol tuple is transformed into an augmented tuple that replaces the original tuple for parameterization purposes. The original tuple is saved so that it may be used for secondary checking. The source port and destination port specified in the rule are each processed. The process starts at 400. At 402, a bitmap or other data structure is updated to indicate that the particular (original, unaugmented) source port is referenced by one or more signatures. At 404, the source port is looked up in a list of critical ports to determine whether it is a critical source port. A bitmap, tree, hash table, or other appropriate data structure may be used for the lookup. If the source port is found in the list of critical ports, then the source port integer is not changed and control is transferred to 407. If the source port is not found in the list of critical source ports, then control is transferred to 406 and the source port is divided by a scaling factor, SF, and a baseline number, BN is added to it. If, for example, BN=100000, then this will yield a value between 100000 and 165535, depending on the scaling factor.

Next, the destination port is processed in a similar manner. At 407, a bitmap or other data structure is updated to indicate that the particular destination port is referenced by one or more signatures. At 408, the destination port is looked up in a list of critical ports to determine whether it is a critical destination port. If the destination port is found in the list of critical ports, then the destination port integer is not changed and control is transferred to 412. If the destination port is not found in the list of critical source ports, then control is transferred to 410 and the destination port is divided by a scaling factor, SF, and a baseline number, BN is added to it. If, for example, BN=100000, then this will yield a value between 100000 and 165535, depending on the scaling factor. At 412, the possibly-augmented source and destination ports are output along with the updated source and destination bitmaps.

The compilation process is applied to all of the original rules in the system to yield augmented rules that reference augmented source ports and augmented destination ports. The source and destination bitmap tables that are updated list each original source port and each original destination port that is referenced by the original rules. The original ports are binned according to the scaling factor SF and the critical ports are omitted from the binning process. If SF is large, then the process will bin many different original ports together into a few augmented ports. The augmented rules will reference relatively few unique augmented ports and a reasonable number of scaled, parameterized rule sets will result when the augmented rules are parameterized.

Figure 5:
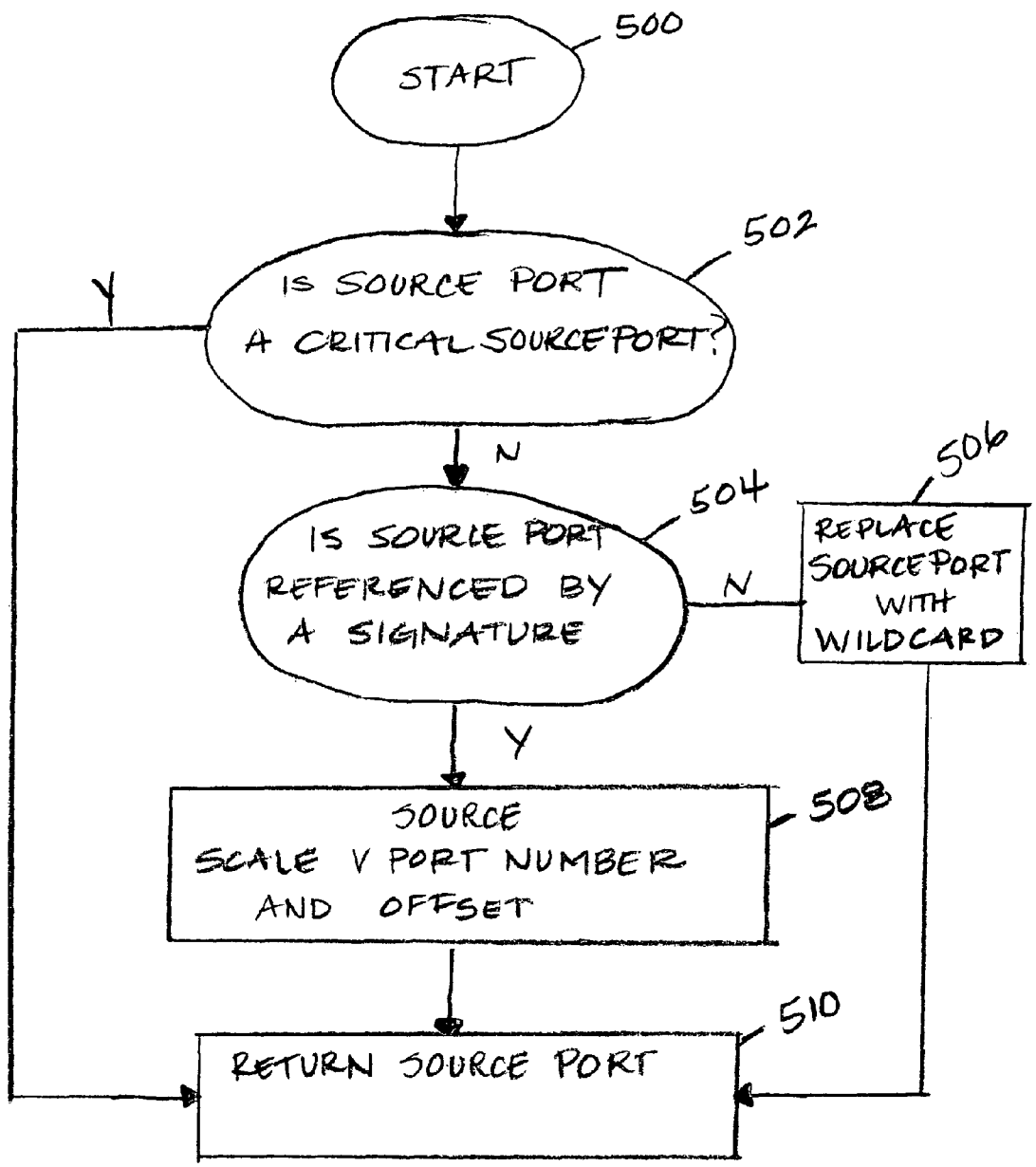
FIG. 5 is a flow chart illustrating a run time process for augmenting port numbers for each new flow having a source, destination protocol tuple.

FIG. 5 is a flow chart illustrating a run time process for augmenting port numbers for each new flow having a source, destination protocol tuple. The source and destination port numbers are each augmented so that a scaled, parameterized rule set that refers to augmented ports can be consulted to determine how to scan the flow.

The process starts at 500. At 502, the port is looked up in list of critical ports. The list is implemented in a bit map or other appropriate data structure. If the port is found, then the port number is not changed and control is transferred to 510. If the port is not found then at 504 the port is looked up in the source or destination port bitmap or other data structure created at compile time to keep track of source or destination ports referenced by one or more signatures. If the port is not found, that indicates that the port is not referenced by any signatures. Control is then transferred to 506 and the port is replaced by a wildcard value such as FFFFFFFF to indicate that there are no strict matches of the port to a port referenced by a signature and control is transferred to 510. If the port is referenced by a signature, then control is transferred to 508 and the port number is augmented by dividing by the scaling factor used during compilation and adding the baseline number used during compilation to the integer result. Control is then transferred to 510. In 510, augmented port is returned.

Once the source and destination ports for the new flow have been possibly transformed into augmented source and destination ports or wildcard values, the scanning engine can search a scaled, parameterized table of rule sets to determine the appropriate scanning policy.

When source and destination port numbers are augmented as described above with scaled, parameterized rules, the scanning policy for each new flow is determined in an efficient manner. Critical ports are not grouped together with other ports, ensuring that they are processed separately for high speed. Ports that are not specifically referenced in a signature set are not scaled along with referenced ports at run time. This improves performance because the engine can exclude such unreferenced ports from scanning rather than scaling and grouping them with other explicitly referenced ports. Only wildcarded rules applying to any ports need be applied to such ports. Low bandwidth ports that are referenced are scaled, and their policies are combined as appropriate.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of evaluating an electronic data transmission comprising:
   transforming, using an electronic processor, a parameter associated with the electronic data transmission into an augmented parameter, wherein the augmented parameter represents a plurality of parameters that have been grouped together to decrease a number of unique parameters in a scaled parameterized rule set, wherein transforming the parameter includes dividing the parameter by a scaling factor and shifting the parameter;
   matching the augmented parameter to the scaled parameterized rule set, wherein the scaled parameterized rule set references the augmented parameter; and
   applying the scaled parameterized rule set to the electronic data transmission.

2. The method as recited in claim 1 further including determining that the parameter is not a designated critical parameter.

3. The method as recited in claim 1 further including determining that the parameter is a referenced parameter.

4. The method as recited in claim 1 wherein the parameter is a port number.

5. The method as recited in claim 1 wherein the network transmission is a packet.

6. The method as recited in claim 1 wherein the network transmission is a flow.

7. A method for parameterizing a set of rules comprising:
   electronically processing, using a processor, a value associated with a port and a protocol by dividing the value by a scaling factor and shifting the value;
   returning an augmented value, wherein the augmented value corresponds to a plurality of values that have been grouped together to decrease a number of unique values in a parameterized rule set; and
   expressing the parameterized rule set in terms of the augmented value.

8. The method as recited in claim 7 wherein processing the value includes determining whether the value is part of a critical set of values.

9. The method as recited in claim 7 further including updating a bitmap to indicate that the value is referenced by a rule.

10. A system for evaluating a data transmission comprising:
    an interface configured to intercept the transmission;
    a processor configured to:
       transform a parameter associated with the data transmission into an augmented parameter wherein the augmented parameter represents a plurality of parameters that have been grouped together to decrease a number of unique parameters in a scaled parameterized rule set, wherein transforming the parameter includes dividing the parameter by a scaling factor and shifting the parameter;
       match the augmented parameter to the scaled parameterized rule set wherein the scaled parameterized rule set references the augmented parameter; and
       apply the scaled parameterized rule set to the data transmission; and
    a memory coupled with the processor and configured to provide the processor with instructions.

11. The system as recited in claim 10 wherein the processor is further configured to determine that the parameter is not a designated critical parameter.

12. The system as recited in claim 10 wherein the processor is further configured to determine that the parameter is a referenced parameter.

13. The system as recited in claim 10 wherein the parameter is a port number.

14. The system as recited in claim 10 wherein the network transmission is a packet.

15. A non-transitory computer readable storage medium having embodied thereon computer instructions which when executed by a computer cause the computer to perform a method comprising:
   transforming a parameter associated with the data transmission into an augmented parameter wherein the augmented parameter represents a plurality of parameters that have been grouped together to decrease a number of unique parameters in a scaled parameterized rule set, wherein transforming the parameter includes dividing the parameter by a scaling factor and shifting the parameter;
   matching the augmented parameter to the scaled parameterized rule set wherein the scaled parameterized rule set references the augmented parameter; and
   applying the scaled parameterized rule set to the data transmission.

* * * * *